US009352729B2

(12) United States Patent
Choi

(10) Patent No.: US 9,352,729 B2
(45) Date of Patent: May 31, 2016

(54) REMOTE CONTROL SYSTEM AND METHOD FOR PARKING BRAKE OF VEHICLE

(71) Applicant: Hyundai Motor Company, Seoul (KR)

(72) Inventor: Byung Yoon Choi, Jeonju, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 9 days.

(21) Appl. No.: 14/470,334

(22) Filed: Aug. 27, 2014

(65) Prior Publication Data

US 2015/0158470 A1 Jun. 11, 2015

(30) Foreign Application Priority Data

Dec. 10, 2013 (KR) ........................ 10-2013-0153276

(51) Int. Cl.
*B60T 7/16* (2006.01)
*B60Q 1/44* (2006.01)
*B60Q 1/46* (2006.01)
*B60Q 1/48* (2006.01)
*B60Q 1/50* (2006.01)

(52) U.S. Cl.
CPC ... *B60T 7/16* (2013.01); *B60Q 1/44* (2013.01); *B60Q 1/46* (2013.01); *B60Q 1/48* (2013.01); *B60Q 1/50* (2013.01); *B60Q 2900/30* (2013.01)

(58) Field of Classification Search
USPC ........................................ 701/2–98
See application file for complete search history.

(56) References Cited

U.S. PATENT DOCUMENTS

| 4,856,622 | A | * | 8/1989 | Sartain | B60T 7/08 188/170 |
| 6,685,281 | B2 | * | 2/2004 | MacGregor | B60T 7/10 303/123 |
| 2002/0024258 | A1 | * | 2/2002 | Ehrmaier | F16H 63/483 307/10.1 |
| 2013/0268144 | A1 | * | 10/2013 | Du | G08C 17/02 701/2 |
| 2014/0244103 | A1 | * | 8/2014 | Uno | B60W 40/09 701/33.4 |
| 2015/0203126 | A1 | * | 7/2015 | Kobana | B60W 50/12 701/93 |

FOREIGN PATENT DOCUMENTS

| JP | 2002-098179 A | 4/2002 |
| KR | 10-1998-083920 A | 12/1998 |
| KR | 10-2001-0064485 A | 7/2001 |
| KR | 20090062038 A | 6/2009 |
| KR | 20100101890 A | 9/2010 |
| KR | 10-2011-0120069 A | 11/2011 |
| KR | 10-2013-0128765 A | 11/2013 |

* cited by examiner

*Primary Examiner* — Rami Khatib
*Assistant Examiner* — Timothy Nesley
(74) *Attorney, Agent, or Firm* — Mintz Levin Cohn Ferris Glovsky and Popeo, P.C.; Peter F. Corless

(57) ABSTRACT

A remote control system and method for a parking brake of a vehicle are provided. The system includes a controller configured to communicate with a server and to operate an electronic parking brake (EPB) disposed within the vehicle. A wireless terminal is configured to communicate with the server and execute application that operates the electronic parking brake. When the vehicle is pushed and moved, a plurality of pressure sensors are configured to measure a pressure applied at a front portion and a rear portion of the vehicle, and the electronic parking brake is remotely released or operated by the controller based on a signal form the wireless terminal.

15 Claims, 4 Drawing Sheets

REMOTE CONTROL SYSTEM AND METHOD FOR PARKING BRAKE OF VEHICLE

CROSS-REFERENCE TO RELATED APPLICATION

This application claims the benefit of priority to Korean Patent Application No. 10-2013-0153276, filed on Dec. 10, 2013 in the Korean Intellectual Property Office, the disclosure of which is incorporated herein in its entirety by reference.

BACKGROUND

1. Field of the Invention

The present invention relates to a remote control system and method for a parking brake of a vehicle that operates a parking brake of a vehicle, and more particularly, to a remote control system for a parking brake of a vehicle that remotely operates a parking brake of a vehicle using a wireless terminal.

2. Description of the Related Art

Generally, a brake system includes a parking brake, which is normally referred to as a hand brake or a side brake to maintain a vehicle stationary. The parking brake is actuated as a driver operates a parking lever disposed at one side of a driver's seat within the vehicle. When the driver pulls the parking lever, a cable connected to the parking lever is pulled and a rear wheel brake assembly connected to the cable is operated to secure braking force. Additionally, when the parking lever is released, the cable is released to release the braking force.

However, for actuating the parking brake using the parking lever as mentioned above, the driver is required to directly manipulate the parking lever. Therefore, when the driver inadvertently attempts to park the vehicle without pulling the parking lever, the vehicle may move down the sloped road etc., resulting in a potential accident. Further, since the driver is required to manipulate the parking lever to park the vehicle or starts driving, the use of the parking lever may be troublesome to the driver.

Accordingly, an electronic parking brake (EPB) to electronically operate the parking brake has been developed. The EPB is a system which automatically applies or releases the parking brake using a simplified switching operation. When an apply command is input from the driver through the switch, the EPB is actuated by an electric motor to restrain a rotation of a rear wheel, such that the vehicle is maintained in a parked condition. When a release command is input from the driver through the switch, the restraint of the rear wheel is to be released by releasing the operation of the EPB, thereby releasing the parked condition of the vehicle.

The EPB system is configured to enable the parking brake to be actuated or released by the input through a parking switch. The EPB system gradually replaces a pure mechanical hand brake within the vehicle. When using the EPB, a relatively larger operation lever in a passenger space may he omitted and thus the passenger space may be more freely implemented. Further, the driver does not need to use substantial power to apply or release the brake. In addition, various functions, such as the brake deactivation, may be electronically and automatically performed on a hill start or the first start after parking. However, in comparison with the pure mechanical hand brakes, the useful features of the EPB system should be accompanied by an improved safety or by a safety comparable to or corresponding to the pure mechanical hand brakes.

SUMMARY

The present invention provides a remote control system for a parking brake of a vehicle that releases a parking brake according to a remote control of a user.

The present invention further provides a remote control system for a parking brake of a vehicle that releases the parking brake at the moment when the release of the parking brake is actually required through a pressure sensor. In addition, the present invention provides a remote control system for a parking brake of a vehicle that provides recognition and warning for the driving direction of the vehicle to a user when the vehicle is pushed.

In accordance with an aspect of the present invention, a remote control system for a parking brake of a vehicle may include: a vehicle configured to communicate with a server and to be equipped with an electronic parking brake (EPB); and a wireless terminal configured to communicate with the server and execute application that operates the electronic parking brake, wherein, when the vehicle is pushed and moves, the vehicle may include a plurality of pressure sensors configured to measure a pressure applied from the pushing of the vehicle disposed at a front portion and a rear portion of the vehicle (e.g., a person pushing the vehicle), and the application may be configured to remotely release or operate the electronic parking brake based on a user operation.

The vehicle may be configured to receive a release preparation signal for a release of the electronic parking brake from the application via the server, and, when the pressure is applied to either the front portion or the rear portion, release the electronic parking brake, and the release preparation signal enables the electronic parking brake to be released when the pressure is applied. A controller within the vehicle may be configured to operate the electronic parking brake when the pressure is applied to both the front and rear portions, after receiving a release preparation signal for a release of the electronic parking brake from the application via the server. The vehicle controller may further be configured to operate the electronic parking brake when the pressure is not applied to both the front and rear portions thereof for a predetermined first time period, after receiving a release preparation signal for a release of the electronic parking brake from the application via the server. The vehicle controller may be configured to operate the electronic parking brake when a predetermined second time period has elapsed, after receiving a release preparation signal for a release of the electronic parking brake from the application through the server.

The vehicle may further include: a movement direction calculating unit configured to calculate a movement at direction of the vehicle; and a pressure direction calculating unit configured to calculate a pressure direction in which the pressure is applied. The movement direction calculating unit and the pressure direction calculating unit may be executed by the controller. Additionally, the vehicle controller may be configured to operate the electronic parking brake when the movement direction does not coincide with the pressure direction, after receiving a release preparation signal for a release of the electronic parking brake from the application via the server.

The vehicle may further include: a headlight disposed in a front portion of the vehicle; and a taillight disposed in a rear portion of the vehicle. The vehicle controller may be configured to turn on any one of the headlight or taillight based on a direction in which the vehicle moves due to the applied pressure. The vehicle may further include: a front-sensing sensor disposed in the front portion; and a rear-sensing sensor disposed in the rear portion, When the vehicle senses that an object exists in the direction in which the vehicle moves due to the applied pressure using the front-sensing sensor and the rear-sensing sensor, the vehicle controller may be configured to warn or notify the driver of the object. The vehicle controller may be configured to provide the object notification by flickering an emergency light disposed within the vehicle or by honking a horn disposed within the vehicle. Alternatively, the object notification may be indicated by changing a time period (e.g., a lighting pattern) in which the emergency light flickers based on a distance with which the object is spaced apart from the vehicle.

BRIEF DESCRIPTION OF THE DRAWINGS

The objects, features and advantages of the present invention will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
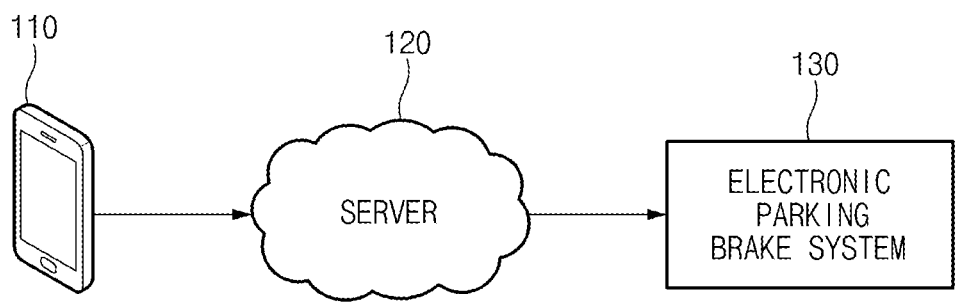
FIG. 1 is an exemplary diagram illustrating a remote control system for a parking brake of a vehicle according to an exemplary embodiment of the present invention.

Hereinafter, exemplary embodiments of the present invention will be described in detail with reference to the accompanying drawings. FIG. 1 is an exemplary diagram illustrating a remote control system for a parking brake of a vehicle according to an exemplary embodiment of the present invention. Referring to FIG. 1, the remote control system of the parking brake of the vehicle may include a wireless terminal 110, a server 120, and an electronic parking brake 130. When the user of the vehicle is away from the vehicle after parking the vehicle (e.g., when the driver is no longer within a predetermined range of the vehicle after the vehicle has been parked), other person may attempt to push the vehicle to slightly move a position of the parked vehicle for either parking or driving his/her own vehicle. The remote control system for the parking brake of the vehicle according to the exemplary embodiment of the present invention may be configured to use a telematics service to enable the user of the vehicle remote from the parked vehicle to operate the electronic parking brake 130 of the parked vehicle using the wireless terminal 110 (e.g., a key fob or the like). Hereinafter, each configuration will be described in detail.

The wireless terminal 110, which may be the wireless terminal of a driver (e.g., or other vehicle us ay be configured to execute the application installed therein, performs data communication with the server, and may be operated by a controller therein (e.g., a wireless controller). In particular, the wireless terminal 110 may be a device such as a smart phone, a tablet personal computer (PC) or a wearable computer, and the application may be provided by the manufacturer of the vehicle and may be a vehicle control application installed and used in the corresponding wireless terminal 110.

The electronic parking brake 130 may be the parking brake disposed within the vehicle. The electronic parking brake 130 may be directly operated or released by the user and the electronic parking brake 130 may be operated by the application installed and executed in the wireless terminal 110. In particular, when the user of the vehicle inputs a command to release the electronic parking brake using the application executed in the wireless terminal 100, a corresponding input may be transferred to the parked vehicle via the server 120 and the corresponding vehicle controller may be configured to release the electronic parking brake 130. Accordingly, the electronic parking brake 130 may be immediately released.

However, when the vehicle is parked on a ramp and may move when the electronic parking brake 130 is released via the server, the user may also control to generate a releasable state to enable the electronic parking brake 130 to be released. In particular, the releasable state may be when the electronic parking brake is released when the pressure for moving the parked vehicle is applied. Accordingly, when other person rather than the user of the vehicle pushes and moves the parked vehicle, the vehicle equipped with the electronic parking brake 130 may enable a plurality of pressure sensors configured to measure the applied pressure applied that may be applied at a front portion and a rear portion of the vehicle. The server 120 may be configured to perform two-way communication with the wireless terminal 110 and the vehicle including the electronic parking brake 130. As a specific example of the two-way communication, a telematics service may be used, but is not limited thereto.

Figure 2:
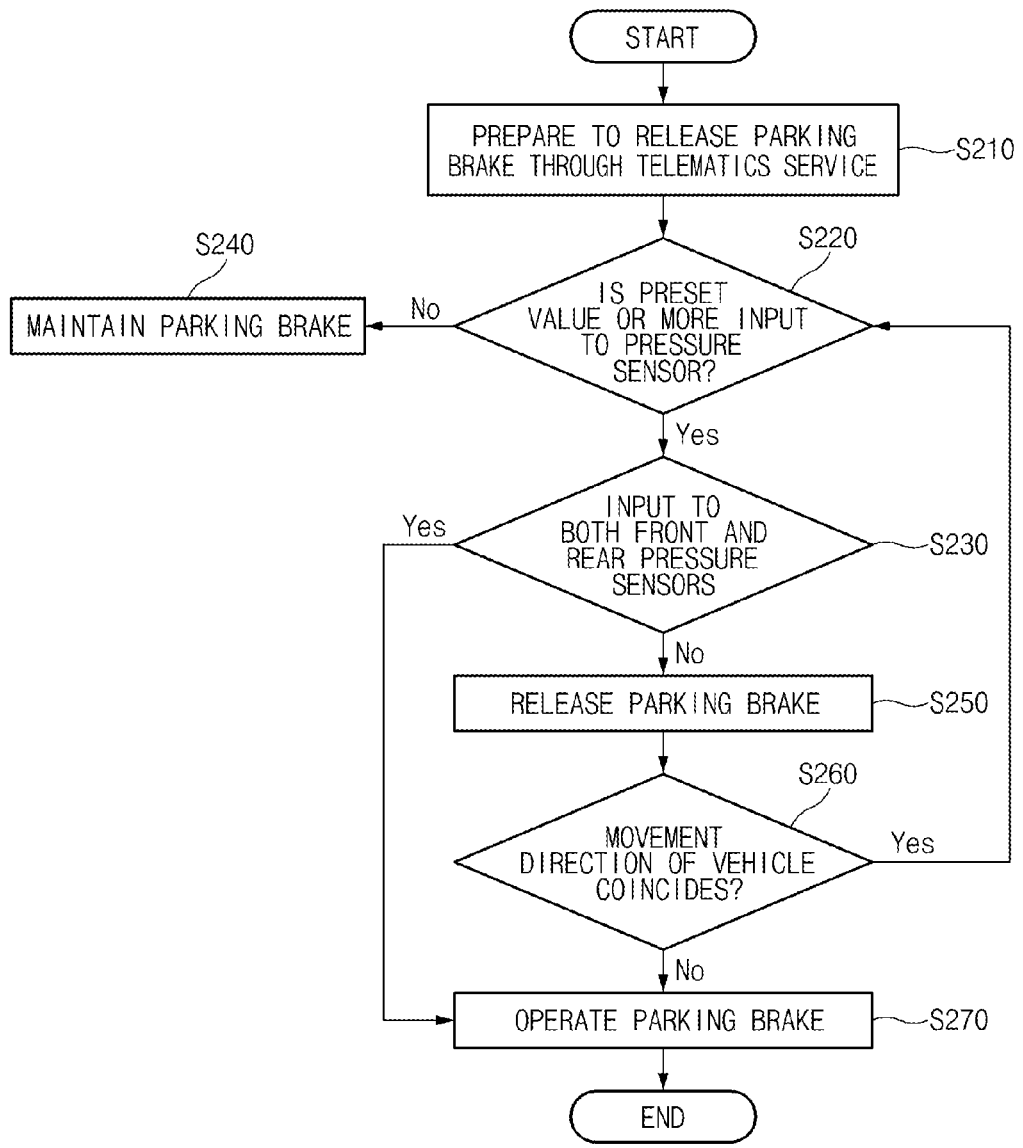
FIG. 2 is an exemplary flow chart illustrating an operation process of releasing or actuating a parking brake of a remote control system for a parking brake of a vehicle according to the exemplary embodiment of the present invention.

FIG. 2 is an exemplary flow chart illustrating a process releasing or actuating a parking brake using a remote control system for a parking brake of a vehicle according to the exemplary embodiment of the present invention. It may be assumed that the user of the vehicle has been contacted by another person requesting to move the vehicle when the user of the vehicle is remote from the vehicle after parking the vehicle. In such a case, the user of the vehicle may execute the vehicle control application in the wireless terminal 110 (e.g., handheld device or the like) to release the electronic parking brake 130 of the parked vehicle or may enter into the releasable state that enables the electronic parking brake 130 to be released by recognizing the applied pressure (S210).

Thereafter, when the pressure is applied to the parked vehicle to push and move the parked vehicle, the parked vehicle (e.g., the vehicle controller) may be configured to measure the applied pressure applied to the corresponding vehicle using the pressure sensors disposed therein and determine whether a pressure of a preset value or greater is measured (S220).

When the applied pressure is less than the preset value, the electronic parking brake 130 of the parked vehicle may be maintained in the operated state (S240), When the applied pressure is the preset value or greater, the electronic parking brake 130 of the parked vehicle may be released (S250). In particular, the vehicle controller may be configured to determine whether the pressure measured by the pressure sensor is measured at a front portion or a rear portion of the vehicle (S230), and when the measured pressure is applied to either the front portion or the rear portion of the vehicle, the vehicle controller may be configured to release the electronic parking brake (S250). When the pressure applied from the exterior of the vehicle is measured at both pressure sensors disposed in the front and rear portions of the vehicle, the vehicle controller may be configured to operate the electronic parking brake (S270). That is, the vehicle controller may be configured to determine that the pressure is not an externally applied pressure in an attempt to move the parked vehicle.

Thereafter, when the electronic parking brake 130 is released (S250), the parked vehicle, for example, by the other person attempting to move the vehicle. In other words, another person other than the vehicle driver may move the parked vehicle without the driver returning to the parked vehicle by remotely and wirelessly releasing the electronic parking brake, thus increasing user convenience.

In addition, the vehicle may further include a movement direction calculating unit executed by the vehicle controller to calculate a movement direction of the vehicle and a pressure direction calculating unit executed by the vehicle controller to calculate a pressure direction in which the pressure is applied.

The vehicle controller may be configured to determine whether the calculated movement direction coincides with the calculated pressure direction, that is, whether the directions are substantially similar (S260). As a result of the determination, when the movement direction is substantially similar to the pressure direction, the vehicle controller may be configured to determine that the parked vehicle is moving safely (e.g., without failure). Then, the procedure may return to measuring the pressure applied to the parked vehicle through the above mentioned pressure sensors (S220).

When the movement direction is not substantially similar to or is different than the pressure direction, the controller may be configured to determine that the parked vehicle is not properly moved due to the pressure applied by another person, thereby operating the electronic parking brake (S270). In other words, the vehicle controller may be configured to determine an abnormal vehicle movement and may therefore operate the electronic parking brake.

As a result, the remote control system for the parking brake of the vehicle according to the exemplary embodiment of the present invention may enable another person to safely move the parked vehicle even when the user of the parked vehicle is located at a remote distance. The user of the vehicle may intend to release the electronic parking brake 130 only for a certain time period.

Figure 3:
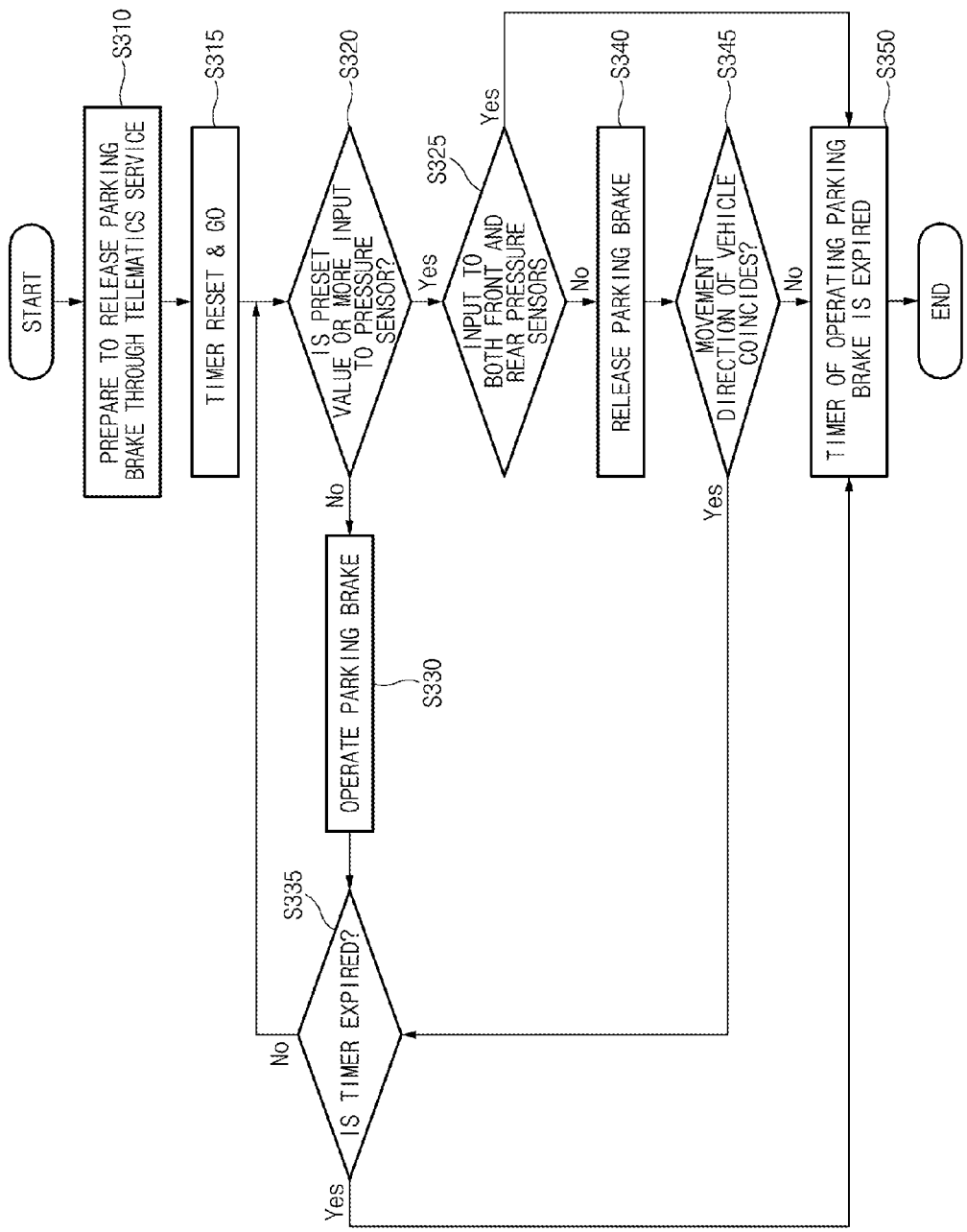
FIG. 3 is an exemplary flow chart illustrating an operation process of a remote control system for a parking brake of a vehicle according to another exemplary embodiment of the present invention.

FIG. 3 is an exemplary flow chart illustrating an operation process remotely controlling an electronic parking brake in the case in which the user of the vehicle may intend to release the electronic parking brake 130 for a certain time period. Similar to FIG. 2, it may be assumed that the user of the vehicle has been contacted by another person requesting to move the parked vehicle when the user of the vehicle is remote from the parked vehicle after parking the vehicle. Since step S310 of FIG. 3 is the same as that of step S210, which is already described in FIG. 2, a detailed description thereof will be omitted.

The user of the vehicle or the vehicle controller (e.g., based on a predetermined user intention) may be configured to set a specific time period when the electronic parking brake 130 is released (S315). Thereafter, when the pressure is applied to the parked vehicle, the vehicle controller may be configured to measure the pressure applied to the vehicle using the pressure sensors disposed therein and determine whether a pressure of the preset value or greater is measured (S320). When the applied pressure is less than the preset value, the electronic parking brake 130 of the parked vehicle may be maintained in the operated state (S330), and the vehicle controller may be configured to determine her the time period set at step S315 has elapsed (S335). As a result of the determination, when the set time has not elapsed yet, the process may return to the step (S320) of determining whether the pressure of the preset value or greater is measured when the electronic parking brake is operated.

Further, when the set time period has elapsed, the procedure may continue to step S350 at which a timer for measuring the set time is expired when the electronic parking brake is operated. When the applied pressure is the preset value or greater, the electronic parking brake 130 of the parked vehicle may be released (S340). In addition, similar to FIG. 2, the vehicle controller may be configured to determine whether the pressure measured by the pressure sensor is measured at a front portion or the rear portion of the vehicle (S325). When the measured pressure is applied to either the front portion or the rear portion of the vehicle, the vehicle controller may be configured to release the electronic parking brake (S340) and when the pressure is applied to both pressure sensors disposed in the front and rear portions of the vehicle, the vehicle controller may be configured to operate the electronic parking brake and proceed to step S350 at which the timer for measuring the set time period may be expired.

Thereafter, when the electronic parking brake 130 is released (S340), the vehicle controller may be configured to determine whether the movement direction of the vehicle is substantially similar to the pressure direction in which the pressure is applied (S345). As a result of the determination, when the movement direction is substantially similar the pressure direction, the procedure may continue to a step (S335) of determining whether the time period set at step S315 has elapsed. When the movement direction is different than the pressure direction, the vehicle controller may be configured to operate (e.g., engage the brake) the electronic parking brake and the procedure may continue to step S350 at which the timer measuring the set time period may be expired.

As a result, the remote control system for the parking brake of the vehicle according to the exemplary embodiment of the present invention may operate the electronic parking brake 130 to be released for a certain time period desired by the user of the vehicle or set by the vehicle controller even when the user of the parked vehicle is located at a remote distance, thereby enabling another person to safely move the parked vehicle during a corresponding time. In addition, as a modified example, when no pressure is applied to the vehicle for a preset time period, the remote control system may enable the electronic parking brake 130 to be operated. When the other person pushes and moves the parked vehicle as the electronic parking brake 130 is released, the other person may not recognize whether there is person or object in a traveling direction of the vehicle.

Figure 4:
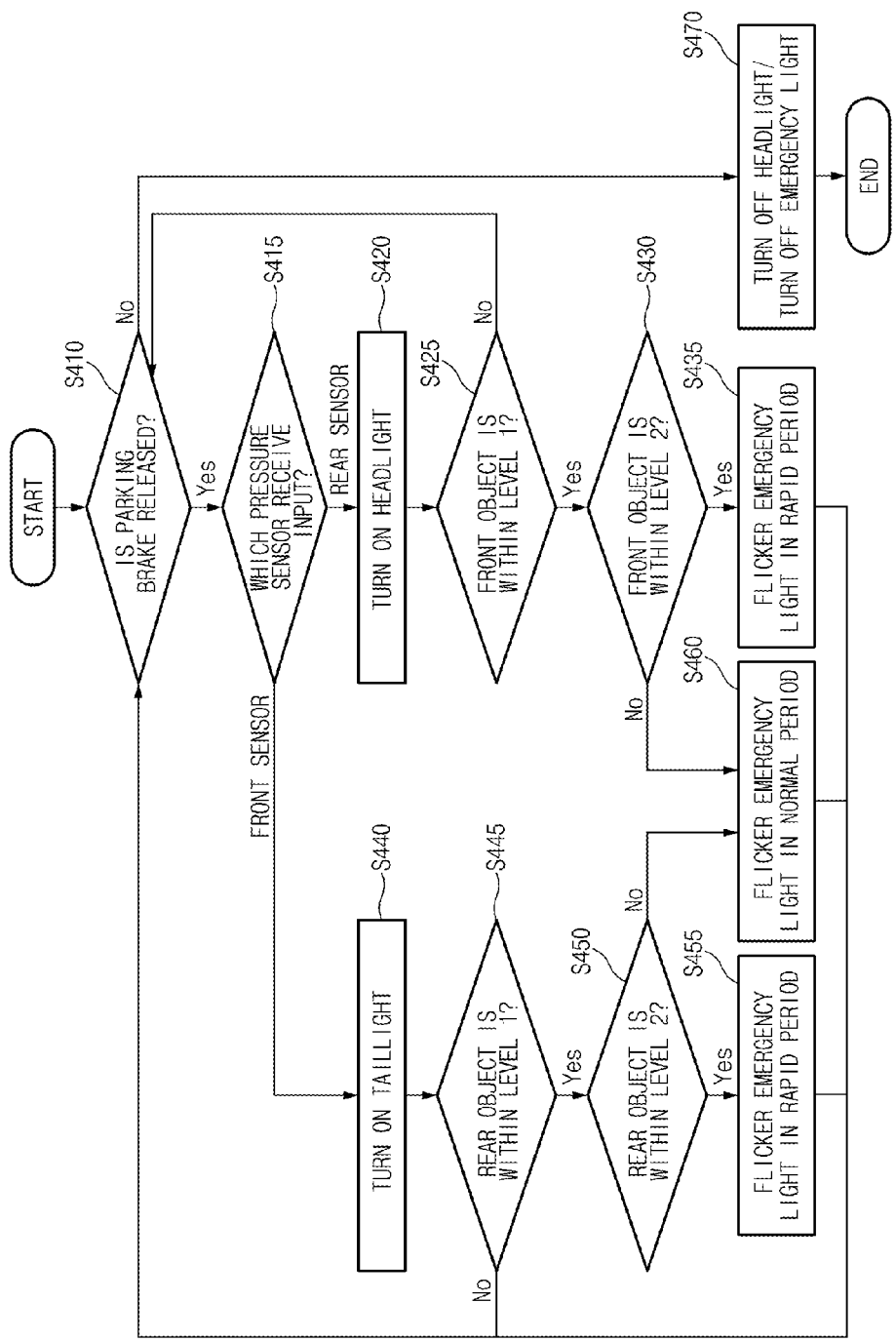
FIG. 4 is an exemplary flow chart illustrating an operating process of a remote control system for a parking brake of a vehicle according to another exemplary embodiment of the present invention.

FIG. 4 is an exemplary flow chart illustrating an operating process of the remote control system for the parking brake of the vehicle according to the exemplary embodiment of the present invention in the case in which there is person or object in the traveling direction of the vehicle when the other person pushes and moves the parked vehicle. Similar to FIGS. 2 and 3, it may be assumed that the user of the vehicle has been contacted by another person requesting to move the parked vehicle when the user of the vehicle is remote from the parked vehicle after parking the vehicle. In addition, the vehicle may include a front-sensing sensor and a rear-sensing sensor configured to determine whether a person or an object exists and determine a spacing distance in the front side or the rear side from the person or the object.

First, the vehicle controller may be configured to determine whether the electronic parking brake 130 is released by the user of the vehicle (S410). As a result of the determination, when the electronic parking brake 130 is not released, the vehicle may maintain the parked state, and the procedure may continue to step S470 at which headlight and tail light may be turned off by the vehicle controller. In addition, when the electronic parking brake 130 is released, similar to FIGS. 2 and 3, the vehicle controller may be configured to determine whether the pressure measured by the pressure sensor is measured at the front portion or the rear portion of the vehicle (S415).

When the pressure is measured by the pressure sensor disposed at the front portion, the tail light may be turned on (S440). Thereafter, the vehicle controller may be configured to determine whether an object exists in the rear portion to which the vehicle moves (e.g., a rear direction of the vehicle) and whether a distance from the corresponding object is within level 1, that is, a predetermined range (S445). When the spaced distance is not within the level 1 (e.g., greater than a predetermine distance range), the process may return to step S410 at which the electronic parking brake 130 is released. Further, when the spaced distance is within the level 1, the vehicle controller may be configured to determine whether the spaced distance is within a level 2 which may be less than the level 1 (S450). The different distance levels may be a range of predetermined distances from the vehicle which may be preset by the vehicle controller.

When the spaced distance is within the level 2, the vehicle controller may be configured to flicker (e.g., a predetermined light pattern) an emergency light disposed within the vehicle in a substantially rapid pattern. Additionally, when the spaced distance is within the level 1, but not within the level 2 (e.g., greater than a first predetermined distance and less than a second predetermined distance), the vehicle controller may be configured to flicker the emergency lights disposed within the vehicle in a normal pattern (e.g., a slower light pattern) (S460). In particular, the distance that corresponds to the levels 1 and 2 may be previously set by the user or manufacturer of the vehicle, and the level 1 may be greater than the level 2.

Returning again to step S415, when the pressure applied to the vehicle is measured by the pressure sensor disposed in the rear portion, the vehicle controller may be configured to turn on the headlight (S420). Thereafter, the vehicle controller may be configured to determine whether an object exists in the front portion to which the vehicle moves (e.g., a forward direction or a traveling direction of the vehicle) and whether a distance from the corresponding object is within level 1 (S425). As a result of the determination, when the spaced distance is not within the level 1, the process may return to step S410 at which the electronic parking brake 130 is released, Further, when the spaced distance is within the level 1, the vehicle controller may be configured to determine whether the spaced distance is within a level 2 which may be less than the level 1 (S430) and when the spaced distance is within the level 2, the vehicle controller may be configured to flicker emergency lights disposed within the vehicle in the substantially rapid pattern (e.g., flicker the lights successively in a particular pattern). When the spaced distance is within the level 1, but not within the level 2, the vehicle controller may be configured to flicker the emergency light disposed within the vehicle in the normal period (S460). In particular, the distance that corresponds to the levels 1 and 2 may be previously set by the user or manufacturer of the vehicle and the level 1 may be greater than the level 2.

As a result, the remote control system for the parking brake of the vehicle according to the exemplary embodiment of the present invention may operate the electronic parking brake 130 to be released even when the user of the parked vehicle is located at the remote distance. In addition, the remote control system may determine the direction in which the parked vehicle moves to turn on the headlights or taillights toward the movement direction of the vehicle and, when a person or an object exists in the movement direction of the vehicle, the remote control system may notify a driver or any other person of the person or object through the flickering of the emergency light, thereby enabling others to safely move the parked vehicle. In addition, the vehicle controller may be configured to adjust the period in which the emergency light flickers based on the distance (e.g., level 1 and level 2) with which the vehicle and the object (or person) are spaced apart, thereby notifying the distance at which the object (or person) exists to the other person. Although it was described in detail that the presence of the person or the object may be recognized by the flickering of the emergency light, but the present invention is not limited thereto. The present invention may inform the other person that the person or the object exists by honking a horn disposed within the vehicle. Similarly, it may also be possible to vary the period in which the horn honks according to the distance (e.g., level 1 and level 2) with which the vehicle and the object (or person) are spaced from each other.

As set forth above, the remote control system for the parking brake of the vehicle according to the exemplary embodiment of the present invention may release the parking brake according to the remote control of the user. In addition, it may be possible to enable the parking brake to be released at the moment when the release of the parking brake is required by using a pressure sensor. It may also be possible to provide the recognition and warning for the driving direction of the vehicle to a user who pushes the vehicle in which a parking brake is released.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. A remote control system for a parking brake of a vehicle, the system comprising:
    a controller configured to communicate with a server using a telematics service to operate an electronic parking brake (EPB) disposed within the vehicle; and
    a wireless terminal configured to communicate with the server and execute application that operates the electronic parking brake,
    wherein, when the vehicle is pushed and moved, a plurality of pressure sensors are configured to measure a pressure applied at a front portion and a rear portion of the vehicle, and the electronic parking brake is remotely released or operated by the controller based on a signal from the wireless terminal, and
    wherein the controller is further configured to:
        calculate a movement direction of the vehicle;
        calculate a pressure direction in which the pressure is applied; and
        operate the electronic parking brake when the movement direction is different than the pressure direction, after receiving a release preparation signal for a release of the electronic parking brake from the wireless terminal via the server.

2. The remote control system of claim 1, wherein the controller is configured to receive a release preparation signal for a release of the electronic parking brake from the wireless terminal via the server, and, when the pressure is applied to either the front portion or the rear portion, release the electronic parking brake, and the release preparation signal enables the electronic parking brake to be released when the pressure is applied.

3. The remote control system of claim 2, wherein the vehicle further includes:
    a headlight disposed in the front portion; and
    a taillight disposed in the rear portion, and
    the controller is configured to turn on any one of the headlight or taillight based on a direction in which the vehicle moves due to the applied pressure.

4. The remote control system of claim 2, wherein the vehicle further comprises:
    a front-sensing sensor disposed in the front portion; and
    a rear-sensing sensor disposed in the rear portion, and
    when the controller is configured to sense that an object is present in the direction in which the vehicle moves due to the applied pressure using the front-sensing sensor and the rear-sensing sensor, and output a notification when the object is present is the direction in which the vehicle moves.

5. The remote control system of claim 4, wherein the controller is configured to output the notification by flickering an emergency light disposed within the vehicle or by operating a horn disposed within the vehicle.

6. The remote control system of claim 5, wherein the controller is configured to output the notification by changing a period in which the emergency light flickers based on a distance with which the object is spaced from the vehicle.

7. The remote control system of claim 1, wherein the controller is configured to operate the electronic parking brake when the pressure is applied to both the front and rear portions, after receiving a release preparation signal for a release of the electronic parking brake from the wireless terminal via the server.

8. The remote control system of claim 1, wherein the controller is configured to operate the electronic parking brake when no pressure is applied to both the front and rear portions for a predetermined first time period, after receiving a release preparation signal for a release of the electronic parking brake from the wireless terminal via the server.

9. The remote control system of claim 1, wherein the controller is configured to operate the electronic parking brake when a predetermined second time period has elapsed, after receiving a release preparation signal for a release of the electronic parking brake from the wireless terminal via the server.

10. A remote control method for a parking brake of a vehicle, the method comprising:
    communicating, by a controller, with a server to operate an electronic parking brake (EPB) disposed within the vehicle;
    measuring, by the controller, a pressure applied at a front portion and a rear portion of the vehicle
    releasing or operating, by the controller, the electronic parking brake based on a release preparation signal from a wireless terminal received via the server;
    calculating, by the controller, a movement direction of the vehicle;
    calculating, by the controller, a pressure direction in which the pressure is applied; and
    operating, by the controller, the electronic parking brake when the movement direction is different than the pressure direction.

11. The method of claim 10, further comprising:
    turning on, by the controller, any one of a headlight or a taillight based on a direction in which the vehicle moves due to the applied pressure,
    wherein the headlight is disposed in the front portion of the vehicle, and
    wherein the taillight is disposed in the rear portion of the vehicle.

12. The method of claim 11, further comprising:
    sensing, by the controller, that an object is present in the direction in which the vehicle moves due to the applied pressure using a front-sensing sensor and a rear-sensing sensor; and
    outputting, by the controller, a notification when the object is present is the direction in which the vehicle moves,
    wherein the front-sensing sensor is disposed in the front portion of the vehicle, and
    wherein the rear-sensing sensor is disposed in the rear portion of the vehicle.

13. A non-transitory computer readable medium containing program instructions executed by a controller for remotely controlling a parking brake of a vehicle, the computer readable medium comprising:
- program instructions that communicate with a server to operate an electronic parking brake (EPB) disposed within the vehicle;
- program instructions that measure a pressure applied at a front portion and a rear portion of the vehicle;
- program instructions that release or operate the electronic parking brake based on a release preparation signal from a wireless terminal received via the server;
- program instructions that calculate a movement direction of the vehicle;
- program instructions that calculate a pressure direction in which the pressure is applied; and
- program instructions that operate the electronic parking brake when the movement direction is different than the pressure direction.

14. The non-transitory computer readable medium of claim 13, further comprising:
- program instructions that turn on any one of a headlight or a taillight based on a direction in which the vehicle moves due to the applied pressure,
- wherein the headlight is disposed in the front portion of the vehicle, and
- wherein the taillight is disposed in the rear portion of the vehicle.

15. The non-transitory computer readable medium of claim 14, further comprising:
- program instructions that sense that an object is present in the direction in which the vehicle moves due to the applied pressure using a front-sensing sensor and a rear-sensing sensor; and
- program instructions that output a notification when the object is present is the direction in which the vehicle moves,
- wherein the front-sensing sensor is disposed in the front portion of the vehicle, and
- wherein the rear-sensing sensor is disposed in the rear portion of the vehicle.

* * * * *